United States Patent [19] [11] 4,157,702
Ogasawala et al. [45] Jun. 12, 1979

[54] AUTOMATIC IGNITION TIMING ADVANCING DEVICE IN IGNITION SYSTEM

[75] Inventors: Nobuhiko Ogasawala, Mito; Masao Kikuchi, Hitachi, both of Japan

[73] Assignee: Hitachi, Ltd., Tokyo, Japan

[21] Appl. No.: 873,872

[22] Filed: Jan. 31, 1978

[30] Foreign Application Priority Data

Feb. 24, 1977 [JP] Japan ................................. 52/19489

[51] Int. Cl.² ............................................. F02P 5/08
[52] U.S. Cl. ............................. 123/149 C; 123/149 R; 123/149 F; 310/70 R
[58] Field of Search ............ 123/149 C, 149 R, 149 D, 123/149 F, 148 CC, 117 R; 310/70 R, 70 A, 153; 315/218

[56] References Cited

U.S. PATENT DOCUMENTS

| | | | |
|---|---|---|---|
| 3,447,521 | 6/1969 | Piteo | 123/148 CC |
| 3,619,634 | 11/1971 | Burson | 123/148 CC |
| 3,651,795 | 3/1972 | Noddin | 123/149 C |
| 3,667,441 | 6/1972 | Cavil | 123/149 D |
| 3,722,488 | 3/1973 | Swift et al. | 123/148 CC |
| 3,809,040 | 5/1974 | Burson et al. | 123/148 CC |
| 3,866,589 | 2/1975 | Haubner et al. | 123/148 CC |
| 3,951,123 | 4/1976 | Haubner et al. | 123/148 CC |

Primary Examiner—Charles J. Myhre
Assistant Examiner—Andrew M. Dolinar
Attorney, Agent, or Firm—Craig and Antonelli

[57] ABSTRACT

A device for automatically advancing the ignition timing in an ignition system for an internal combustion engine is disclosed, in which the ignition timing is fixed constant in a low speed range of the rotation of the engine, advanced in an intermediate speed range lower than a predetermined rotary speed, and fixed constant again in a high speed range higher than the predetermined rotary speed. In this automatic ignition timing advancing device, a positive pulse signal generated at a first phase corresponding to the ignition timing in the low speed range, a negative pulse signal generated at a second phase corresponding to the ignition timing in the high speed range, and a positive voltage signal having an amplitude increasing with time in the phase range including the first phase and second phase are combined to provide a composite signal used as a control signal for controlling the ignition timing. The negative pulse signal has a large pulse width so that the peak value of the control signal waveform appearing on the leading side of the second phase can be reduced to a level lower than a predetermined level.

2 Claims, 16 Drawing Figures

FIG. 9
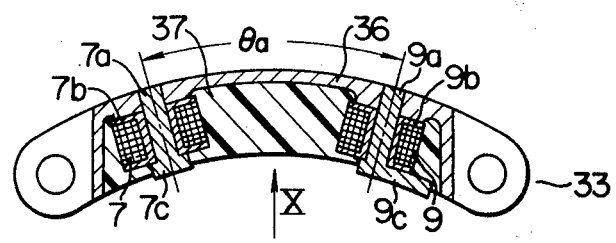
FIG. 10
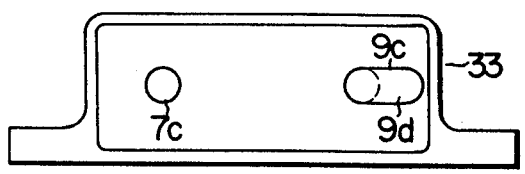
FIG. 11a  FIG. 11b
 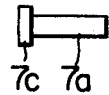
FIG. 13
FIG. 12a  FIG. 12b
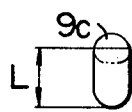 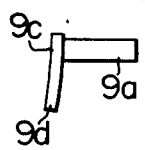
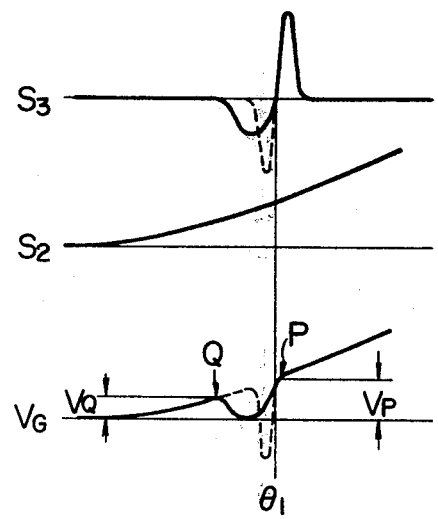

AUTOMATIC IGNITION TIMING ADVANCING DEVICE IN IGNITION SYSTEM

LIST OF PRIOR ART REFERENCES (37 CFR 1.56(a))

The following references are cited to show the state of the art:

(1) U.S. Pat. No. 3,651,795
    Ray C. Noddin et al.
    Mar. 28, 1972    123/149A, 123/149C
(2) U.S. Patent application Ser. No. 802,464
    filed on June 1, 1977.

This invention relates to ignition systems for internal combustion engines, and more particularly to a device for automatically advancing the ignition timing in such an ignition system.

The present invention and its advantages will be described in detail with reference to the accompanying drawings, in which:

FIG. 9 is a schematic sectional view to illustrate the detailed structure of the signal generating coil assembly in the magneto generator employed in the present invention;

FIG. 10 is a bottom plan view of the signal generator coil assembly when viewed in a direction of the arrow X in FIG. 9;

Figure 14:
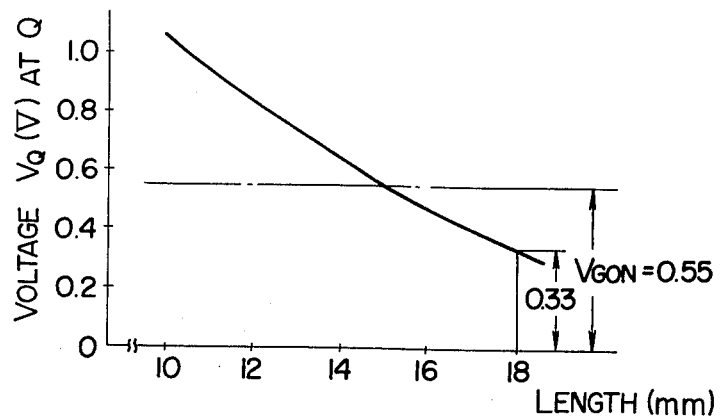
Figure 15:
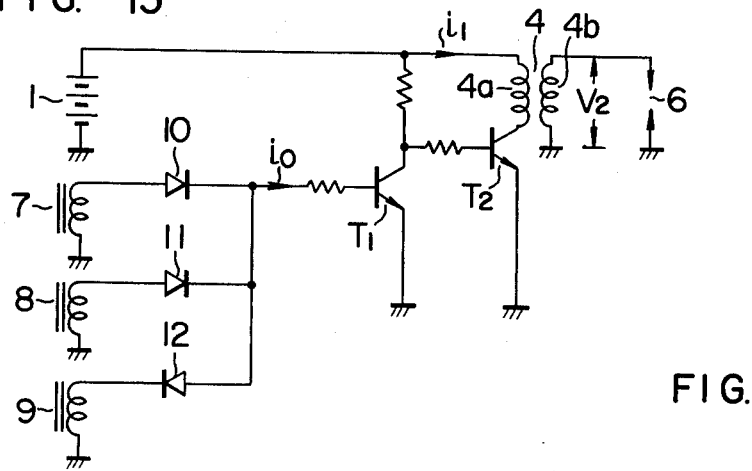
Figure 16:
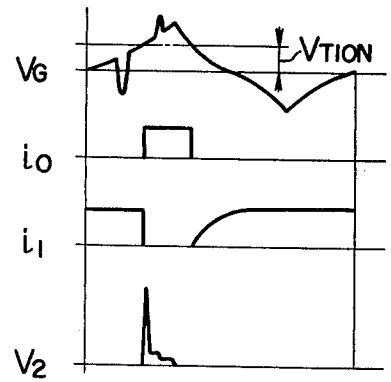

FIGS. 11(a) and 11(b) are an end view and a side view respectively showing schematically the shape of a core combined with a signal generating coil in the signal generating coil assembly;

FIGS. 12(a) and 12(b) are an end view and a side view respectively showing schematically the shape of another core combined with another signal generating coil in the signal generating coil assembly;

FIG. 13 is a waveform diagram illustrating the waveform of the control signal generated in the embodiment of the ignition timing advancing device according to the present invention;

FIG. 14 is a graph illustrating, by way of example, how the length of the magnetic pole of the core shown in FIGS. 12(a) and 12(b) is determined in the embodiment of the present invention;

FIG. 15 is an electrical circuit diagram of an ignition system of current interruption type provided with the automatic ignition timing control device according to the present invention; and FIG. 16 is a waveform diagram illustrating voltage and current waveforms appearing at various parts of the circuit shown in FIG. 15.

The length of time required for the ignition and subsequent complete combustion of the fuel-air mixture in an internal combustion engine is approximately constant, and it is therefore necessary for the efficient yielding of engine power to ignite the fuel-air mixture with proper timing determined depending on the rotary speed of the engine in view of the approximately constant length of time required for the complete combustion of the fuel-air mixture. When the ignition timing is later than the proper timing, explosion occurs at a position exceeding considerably the upper dead point of the piston in the cylinder, and the force imparted to the piston is reduced to cause a reduction in the horsepower output of the engine. When, conversely, the ignition timing is earlier than the proper timing, explosion occurs before the upper dead point of the piston is reached, and the piston is urged in the opposite direction to give rise to the knocking. Due to this knocking, the force effective in producing the horsepower output is not imparted to the piston, and the burning fuel-air mixture is compressed to raise the internal temperature of the cylinder.

It is therefore necessary to suitably advance the ignition timing with the increase in the rotating speed of the engine. However, in a high speed range higher than a predetermined rotary speed of the engine, this advance in the ignition timing with the increase in the rotary speed of the engine will produce an unusually high internal temperature of the cylinder givng rise to troubles including fusion of part of the piston. It is therefore desirable to maintain the ignition timing constant in a high speed range higher than the predetermined rotary speed of the engine.

A device for automatically advancing the ignition timing in an ignition system for an internal combustion system is disclosed in our U.S. patent application Ser. No. 802,464 and German patent application No. 2726017, in which three electrical signals are used so that the ignition timing can be fixed constant in a low speed range of the rotation of the engine, advanced in an intermediate speed range, and fixed constant again in a high speed range.

The disclosed device for automatically advancing the ignition timing will be described with reference to FIGS. 1 to 4 before describing the present invention in detail.

Figure 1:
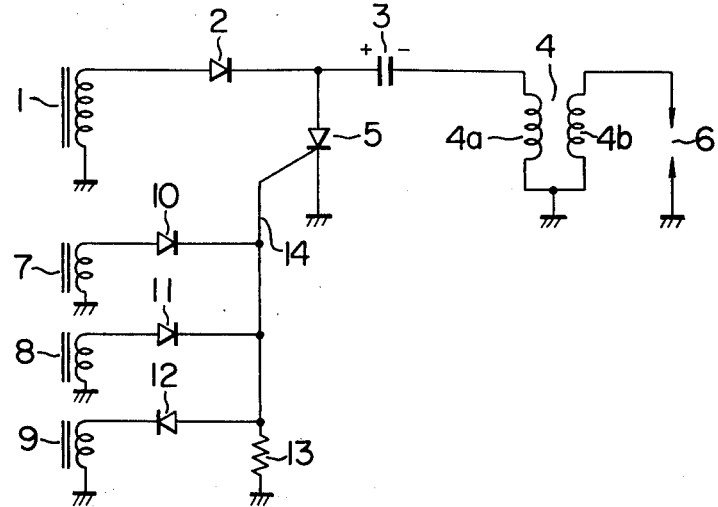
FIG. 1 is an electrical circuit diagram of an ignition system of capacitor discharge type provided with a prior art automatic ignition timing advancing device.

FIG. 1 is an electrical circuit diagram of an ignition system of capacitor discharge type provided with the proposed automatic ignition timing advancing device.

Referring to FIG. 1, voltage is generated across a capacitor charging coil 1 in a magneto generator to supply a current through a rectifying diode 2 and a capacitor 3 to a primary winding 4a of an ignition coil 4 thereby charging the capacitor 3 in the illustrated polarity. Then, when a trigger signal input is applied to the gate of a thyristor 5, the thyristor 5 is turned on, and the electrical charge stored in the capacitor 3 discharges through the thyristor 5 and the primary winding 4a of the ignition coil 4. Consequently, a high voltage is induced across a secondary winding 4b of the ignition coil 4 to cause a spark to jump across the spark gap of a spark plug 6.

The trigger signal input determining the ignition timing is applied to the gate of the thyristor 5 from three signal generating coils, that is, a first coil 7 generating a first signal $S_1$ effective in determining the ignition timing in the low speed range of the rotation of the engine, a second coil 8 generating a second signal $S_2$ effective in determining the ignition timing in the intermediate speed range, and a third coil 9 generating a third signal $S_3$ effective in determining the ignition timing in the high speed range. These signals $S_1$, $S_2$ and $S_3$ are applied to the gate of the thyristor 5 from the coils 7, 8 and 9 through diodes 10, 11 and 12 respectively and through a lead 14 which is grounded through a signal level adjusting resistor 13. These coils 7, 8 and 9 are incorporated in the magneto generator.

Figure 2:
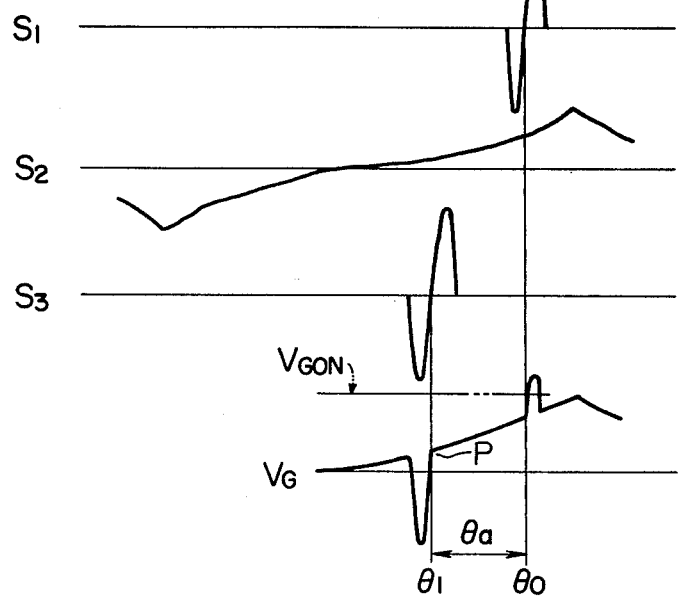
FIG. 2 is a waveform diagram showing waveforms of three signals generated by a magneto generator and that of a composite signal obtained by combining these three signals for controlling the ignition timing.

FIG. 2 shows the voltage waveforms and phase relationship of the signals $S_1$ to $S_3$ generated by the coils 7 to 9 respectively. Referring to FIG. 2, the phase of the first signal $S_1$ effective in determining the ignition timing in the low speed range is set at $\theta_0$, and the signal has a pulse waveform as shown. The phase $\theta_1$ of the third signal $S_3$ effective in determing the ignition timing in the high speed range leads the phase $\theta_0$ of the first signal $S_1$ by $\theta_a$, and the signal $S_3$ has the same waveform as that of the first signal $S_1$. The second signal $S_2$ effective in determining the ignition timing in the intermediate speed range has a gradually rising waveform such that its amplitude increases with time in the phase range including the phases $\theta_1$ and $\theta_0$, and its maximum amplitude is less than that of the signals $S_1$ and $S_3$.

When such three signals $S_1$, $S_2$ and $S_3$ are applied through the respective diodes 10, 11 and 12 to the gate of the thyristor 5 after being combined together on the lead 14 as shown in FIG. 1, the positive portions of the signals $S_1$ and $S_2$ and the negative portion of the signal $S_3$ are only effective, and the composite voltage $V_G$ applied finally to the gate of the thyristor 5 has a waveform as shown in FIG. 2. This composite signal $V_G$ provides the control signal which controls the ignition timing. Suppose that $V_{GON}$ is the turn-on voltage of the thyristor 5, then the ignition timing is provided at the phase at which the gate signal voltage $V_G$ attains the level of the turn-on voltage $V_{GON}$ of the thyristor 5. In the composite signal waveform shown in FIG. 2, the thyristor 5 is turned on at the phase $\theta_0$, and the ignition timing is thus set at the phase $\theta_0$. With the increase in the rotating speed of the engine, the signal voltages of the three signals $S_1$, $S_2$ and $S_3$ increase to advance the ignition timing from the phase $\theta_0$.

Figure 3:
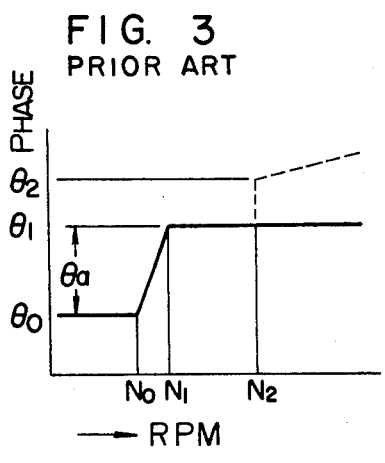
FIG. 3 is a graph illustrating the relation between the rotating speed of an internal combustion engine and the ignition timing.

FIG. 3 shows the relation between the rotary speed of the engine and the ignition timing In the low speed range up to a rotary speed $N_0$, the ignition timing is determined by the positive portion of the waveform of the signal $S_1$ and is substantially fixed at the position of phase $\theta_0$. The ignition timing in the intermediate speed range between the rotary speed $N_0$ and a higher rotary speed $N_1$ is controlled by the signal $S_2$, and, in this case, the ignition timing is advanced in a manner as shown in FIG. 3. At the rotary speed $N_1$, the operating point on the composite signal waveform $V_G$ shifts to a point P in FIG. 2, and in the high speed range higher than the speed $N_1$, the ignition timing is substantially fixed at the position of phase $\theta_1$ by the effect of the negative portion of the waveform of the signal $S_3$.

Figure 4:
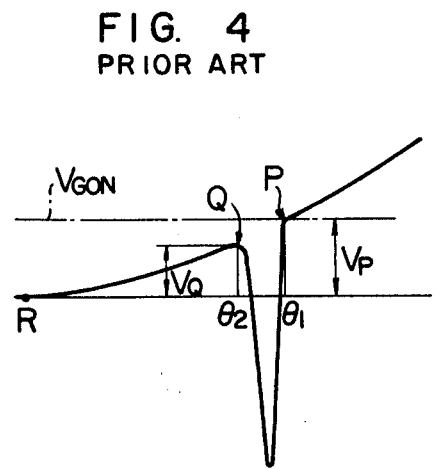
FIG. 4 is an enlarged view of part of the control signal waveform to illustrate how the ignition timing is unusually advanced in the high speed range of the rotation of the internal combustion engine.
Figure 5:
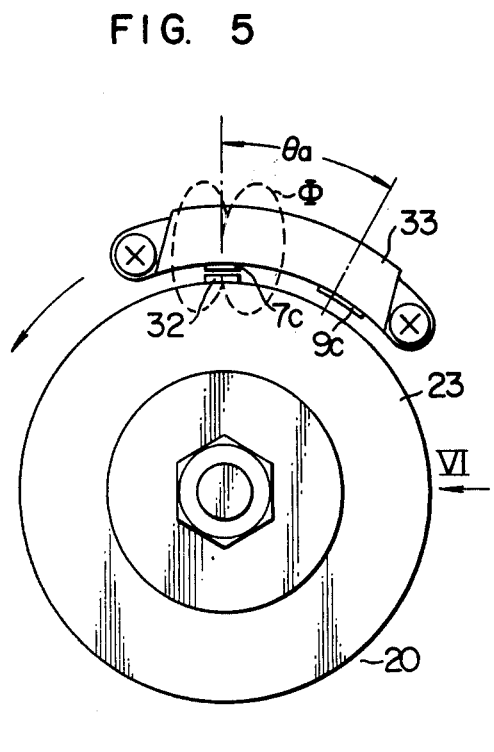
FIG. 5 is a schematic front elevational view of a magneto generator employed in an embodiment of the automatic ignition timing advancing device according to the present invention.
Figure 6:
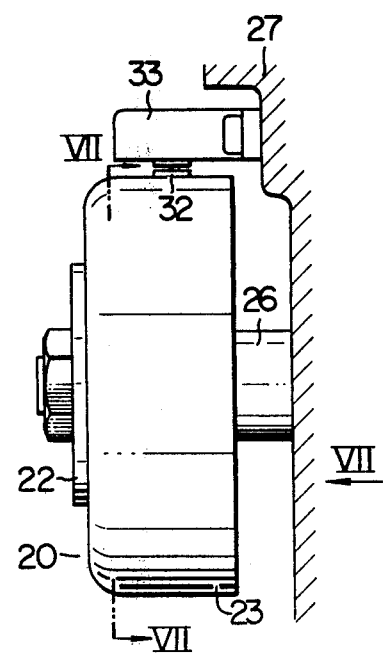
FIG. 6 is a schematic side elevational view of the magneto generator when viewed in a direction shown by the arrow VI in FIG. 5.
Figure 7:
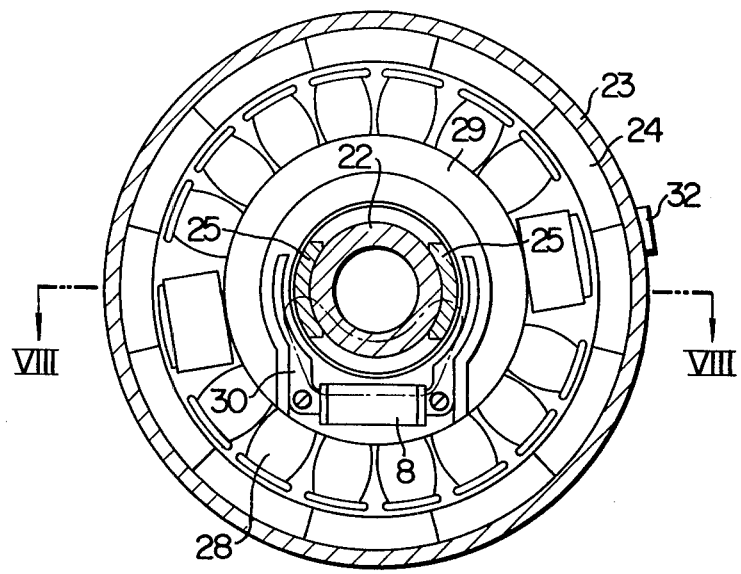
FIG. 7 is a schematic sectional view taken along the line VII—VII in FIG. 6 to illustrate the internal structure of the magneto generator.
Figure 8:
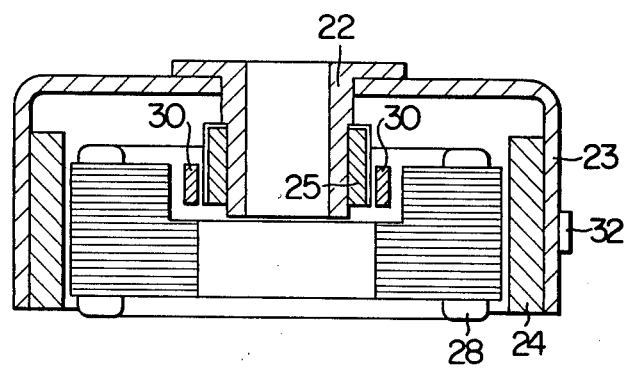
FIG. 8 is a schematic sectional view taken along the line VIII—VIII in FIG. 7.

In the operation of the proposed automatic ignition timing advancing device above described, the ignition timing has tended to make an abrupt advance in the high speed range higher than the speed $N_1$ as shown by the broken line in FIG. 3. Such a phenomenon will be explained in detail with reference to FIG. 4, which shows parts of the waveform of the composite gate signal voltage $V_G$ when the rotary speed of the engine is $N_1$ in FIG. 3. Referring to FIG. 4, the intersection P between the turn-on level $V_{GON}$ of the thyristor 5 and the waveform of the composite gate signal voltage $V_G$ provides the operating point, and the ignition timing is set at the position of phase $\theta_1$. The voltage $V_P$ at the point P is given by $V_P = V_{GON}$. Suppose that the voltage $V_Q$ at a peak point Q located on the leading side of the point P becomes equal to the turn-on level $V_{GON}$ of the thyristor 5 due to the increase in the rotary speed of the engine up to a value $N_2$ in FIG. 3. Then, the operating point shifts to the point Q from the point P, and the ignition timing at this rotary speed $N_2$ is abruptly advanced from the position of phase $\theta_1$ to that of phase $\theta_2$. With a further increase in the rotating speed of the engine, the ignition timing is further advanced along the curve QR. Such an excessive advance in the ignition timing in the high speed range of the engine is undesirable in that the engine is excessively heated up to an unusually high temperature.

It is therefore a primary object of the present invention to provide a novel and improved automatic ignition timing advancing device which prevents such an ignition timing advancing tendency at high speeds lower than the highest operating rotary speed of the engine.

Suppose that the ratio $V_P/V_Q$ between the voltage level $V_P$ at the point P and the voltage level $V_Q$ at the point Q is a when the point P is the operating point at the rotary speed $N_1$ of the engine, and the ignition timing is set at the position of the phase $\theta_1$ as shown in FIG. 4. Then, the rotary speed at which the operating point shifts from the point P to the point Q, that is, the rotary speed $N_2$ giving rise to the abrupt advance in the ignition timing from the position of phase $\theta_1$ to that of phase $\theta_2$ is given by $N_2 = aN_1$, since the composite gate signal voltage $V_G$ increases substantially in proportion to the rotary speed of the engine. Therefore, the value of $N_2$ can be increased by increasing the value of a. The ignition timing advancing tendency at high speeds can thus be obviated when the value of a is selected to be sufficiently large so that the value of $N_2$ exceeds the highest operating rotary speed of the engine.

Referring now to FIGS. 5, 6, 7 and 8, a magneto generator 20 includes a rotor consisting of a flanged sleeve 22, a cup-shaped member 23 fixed to the sleeve 22, main permanent magnets 24 mounted on the inner peripheral face of the cup-shaped member 23, and auxiliary permanent magnets 25 mounted on the outer peripheral face of the sleeve 22. The rotor is fixedly mounted on an extension 26 of the crankshaft extending into the sleeve 22 so that it can rotate with the rotation of the engine. The stator of the magneto generator 20 is fixed to a portion 27 of the crank case by fixing means (not shown). The stator includes a stator core 29 on which battery charging coils 28 cooperating with the main magnets 24 are mounted together with a capacitor charging coil 1 charging a capacitor 3 as shown in FIG. 1.

The stator core 29 carries a signal generating coil 8 which is mounted on a core 30 to cooperate with the auxiliary magnets 25. This signal generating coil 8 generates a second signal $S_2$ as shown in FIG. 2 in synchronism with the rotation of the engine. A magnetic pole 32 is partly embedded in the cup-shaped member 23 to protrude outward from the cylindrical outer face of the cup-shaped member 23, and a coil assembly 33 is fixed to the crank case portion 27 and disposed opposite to the magnetic pole 32 while defining an air gap therebetween. This magnetic pole 32 is excited by a permanent magnet embedded in the cylindrical wall of the cup-shaped member 23 or the main magnets 24.

The coil assembly 33 includes two signal generating coils 7 and 9 therein as shown in FIGS. 9 and 10 for generating first and third signals $S_1$ and $S_3$ respectively as shown in FIG. 2 in synchronism with the rotation of the engine by cooperating with the magnetic pole 32. The coil 7 generating the signal $S_1$ is wound around a core 7a through a bobbin 7b, and the coil 9 generating the signal $S_3$ is wound around a core 9a through a bobbin 9b. These coils 7 and 9 are disposed in a coil case 36 in such a relation that the axis of the core 7a is spaced by an angle $\theta_a$ from that of the core 9a in the circumferential direction of the coil case 36. The cores 7a and 9a are fixed at one end thereof in the wall of the coil case 36, and the internal space of the coil case 36 is packed with an electrical insulator 37 such as a synthetic resin material.

In the prior art device proposed by the inventors, both the magnetic pole 7c of the core 7a and the magnetic pole 9c of the core 9a have a circular shape of predetermined diameter when viewed from the side of the rotor. According to the present invention, the magnetic pole 7c of the core 7a has a circular shape of predetermined diameter in end view as in the prior art device, but the magnetic pole 9c of the core 9a differs from that in the prior art device in that, in end view, its shape consists of a circle having a diameter approximately the same as that of the circle of the magnetic pole 7c and an extension 9d extending from the circle in a direction opposite to the direction of rotation of the rotor of the magneto generator 20.

FIG. 11 shows at (b) the shape of the core 7a haing the magnetic pole 7c, viewed in the same manner as in FIG. 9. As shown at (a) of FIG. 11 the magnetic pole 7c has a circular shape in end view. FIG. 12 shows at (b) the shape of the core 9a having the magnetic pole 9c, viewed in the same manner as in FIG. 9. As shown at (a) of FIG. 12, the magnetic pole 9c has a generally flat-oval shape in end view. It will be apparent from (a) of FIG. 12 that the shape of the magnetic pole 9c consists of a circle having a diameter approximately the same as that of the magnetic pole 7c of circular shape and an extension 9d extending from this circle in a predetermined direction. The magnetic pole 9c has an arcuate sectional contour so that the air gap defined between it and the rotor of the magneto generator 20 can be made substantially uniform in the circumferential direction of the coil assembly 33. The extension 9d extends in a direction opposite to the direction of rotation of the rotor of the magneto generator 20. The magnetic flux $\phi$ emanating from the magnetic pole 32 excited by the main magnets 24 passes through the cores 7a and 9a of the signal generating coils 7 and 9 to energize the same as shown by the broken lines in FIG. 5. The amount of magnetic flux $\phi$ crossing the signal generating coils 7 and 9 varies depending on the angular rotation of the rotor, hence, the position of the magnetic pole 32 relative to the positions of the signal generating coils 7 and 9 due to the rotation of the engine, and these coils 7 and 9 generate the signals $S_1$ and $S_3$ shown in FIG. 2 respectively.

Since the magnetic pole 9c of the core 9a includes the extension 9d extending in the direction opposite to the direction of rotation of the rotor of the magneto generator 20, the intensity varying position of the magnetic flux shifts in a direction opposite to the direction of rotation of the rotor. Thus, the signal $S_3$ generated by the coil 9 has now a waveform as shown by the solid line in FIG. 13. It will be seen from FIG. 13 that the negative portion of the signal waveform $S_3$ starts to rise earlier than and has a pulse width wider than the original waveform shown by the broken line in which case the magnetic pole 9c does not include the extension 9d. In FIG. 13, the broken-like waveform of the composite signal $V_G$ is obtained by combining the signal $S_2$ with the signal $S_3$ having the negative waveform portion shown by the broken line, while the solid-line waveform of the composite signal $V_G$ is obtained by combining the signal $S_2$ with the signal $S_3$ having the widened negative pulse width shown by the solid line. It will be apparent from FIG. 13 that the peak value $V_G$ of the voltage waveform appearing on the leading side relative to the phase $\theta_1$ can be decreased according to the present invention. Thus, the ratio a between $V_P$ and $V_Q$, or $V_P/V_Q$, can be increased to raise the level of the rotating speed $N_2$ at which the undesirable tendency of advancing the ignition timing has occurred. The value of $N_2$ can be set to be sufficiently greater than the highest allowable rotating speed of the engine by suitably determining the length of the extension 9d of the magnetic pole 9c of the core 9a, so that the undesirable ignition timing advancing tendency in the high speed range of the rotation of the engine can be effectively obviated.

The length of the extension 9d of the magnetic pole 9c of the core 9a, in other words, the length L measured from the axis of the core 9a should be determined on the basis of the turn-on voltage level of the thyristor 5 and the signal voltages generated by the signal generating coils 7, 8 and 9. It is most desirable to determine the length L so that the composite signal $V_G$ has zero amplitude between the position of rising phase of the signal $S_2$ and the position of phase $\theta_1$, but such is practically impossible due to the structural limitations. Therefore, the length L is so determined in the present invention that at least the voltage level $V_Q$ includes an allowance or margin relative to the turn-on voltage level $V_{GON}$ of the thyristor 5 within the practically used rotary speed range.

FIG. 14 illustrates, by way of example, the relation between the length L of the magnetic pole 9c of the core 9a and the voltage level $V_Q$ at the point Q on the composite signal waveform when an engine has a highest rotary speed of 1,100 r.p.m. It will be seen in FIG. 14 that the length L is set at 18 mm to provide the voltage level $V_Q$ of 0.33 volts when the turn-on voltage $V_{GON}$ of the thyristor 5 used in the ignition system of the engine is 0.55 volts.

FIG. 15 is an electrical circuit diagram of an ignition system of current interruption type provided with the automatic ignition timing advancing device of the present invention above described. In FIG. 15, the same reference numerals are used to denote the same parts appearing in FIG. 1. A transistor $T_1$ in FIG. 15 has a turn-on level $V_{T1ON}$. When the level of the composite signal $V_G$ applied to the base of this transistor $T_1$ exceeds its turn-on level $V_{T1ON}$, the transistor $T_1$ is turned on to turn off another transistor $T_2$. Consequently, the current flowing through the primary winding $4a$ of the ignition coil 4 is interrupted to induce a high voltage across the secondary winding $4b$. FIG. 16 shows the phase relationship among the waveform of the composite signal $V_G$, the currents $I_0$ and $I_1$ flowing through the circuit shown in FIG. 15, and the high voltage induced across the secondary winding $4b$ of the ignition coil 4. Those skilled in the art will readily understand that the present invention is also applicable to the ignition system of current interruption type when the foregoing description is read while replacing the turn-on voltage $V_{GON}$ of the thyristor 5 by the turn-on level $V_{T1ON}$ of the transistor $T_1$.

We claim:

1. A device for automatically advancing the ignition timing in an ignition system for an internal combustion engine including an ignition coil consisting of a primary winding and a secondary winding arranged to induce a high voltage thereacross in response to an intermittent flow of a current through said primary winding, a spark plug generating an ignition spark across its spark gap in response to the supply of said induced high voltage, and current control means making on-off operation for controlling said intermittent current flow through said primary winding of said ignition coil, said device comprising:

means for generating, in synchronism with the rotation of the engine, a first signal of a positive voltage pulse having a rising point at a first predetermined phase;

means for generating, in synchronism with the rotation of the engine, a second signal of a negative voltage pulse having a rising point at a second predetermined phase leading said first predetermined phase;

means for generating, in synchronism with the rotation of the engine, a third signal including a positive voltage waveform portion having an amplitude increasing with time within the phase range including said first predetermined phase and said second predetermined phase, said amplitude being smaller than that of said positive voltage pulse in said first signal at said first predetermined phase; and means for combining said first, second and third signals together to provide a composite signal which is supplied to said current control means as a control signal for controlling the on-off operation of said current control means, said means for generating said second pulse including means for extending the width of said second pulse such that the peak voltage level appearing in said composite signal at a phase leading said second predetermined phase as the result of the combination of said second and third signals is lower than a threshold level used for the control of the on-off operation of said current control means.

2. A device for automatically advancing the ignition timing in an ignition system for an internal combustion engine comprising:

a magneto generator generating a first ac voltage in pulse form at a first predetermined phase, a second ac voltage in pulse form at a second predetermined phase leading said first predetermined phase, and a third ac voltage having an amplitude increasing with time within the phase range including said first predetermined phase and said second predetermined phase;

means for extracting a positive voltage pulse signal from said first ac voltage, a negative voltage pulse signal from said second ac voltage, and a positive voltage signal from said third ac voltage, said positive voltage signal having an amplitude increasing with time within the phase range including said first predetermined phase and said second predetermined phase; and means for combining said three signals together to provide a composite signal used as a control signal for controlling the ignition timing;

said magneto generator comprising:

a rotor;

a stator;

a magnetic pole mounted in said rotor; a permanent magnet for exciting said magnetic pole;

a first coil mounted in said stator at a position corresponding to said first predetermined phase related to the angular rotation of said rotor for generating said first ac voltage by cooperating with said magnetic pole mounted in said rotor, said first coil being wound around a core;

a second coil mounted in said stator at a position corresponding to said second predetermined phase related to the angular rotation of said rotor for generating said second ac voltage by cooperating with said magnetic pole mounted in said rotor, said second coil being wound around a core having an elongated magnetic pole in which the length of the portion extending from the core axis in a direction opposite to the direction of rotation of said rotor is greater than the portion extending from the core axis in the same direction as the direction of rotation of said rotor;

another permanent magnet mounted in said rotor; and a third coil mounted in said stator for generating said third ac voltage by cooperating with the last said permanent magnet.

* * * * *